United States Patent [19]
In't Veld

[11] 3,909,416
[45] Sept. 30, 1975

[54] METHOD AND APPARATUS FOR SEPARATING LIQUIDS OF DIFFERENT SPECIFIC GRAVITIES FROM A MIXTURE OF THE SAME

[75] Inventor: Cornelis In't Veld, Vlaardingen, Netherlands

[73] Assignee: Hydrovac Systems International, Inc., New York, N.Y.

[22] Filed: June 23, 1971

[21] Appl. No.: 155,815

[30] Foreign Application Priority Data
Nov. 10, 1970 Netherlands.................. 7016406

[52] U.S. Cl................................. 210/242; 210/DIG. 21
[51] Int. Cl.$^2$........................................ E02B 15/04
[58] Field of Search ...... 210/83, 242, DIG. 21, 169, 210/459, 114, 115, 116, 406, 71, 74, 258, 84, 540

[56] References Cited
UNITED STATES PATENTS

| | | | |
|---|---|---|---|
| 1,211,334 | 1/1917 | Beach et al......................... | 210/459 |
| 1,948,543 | 2/1934 | Samiran.............................. | 210/115 |
| 2,330,508 | 9/1943 | McColl............................... | 210/DIG. 21 |
| 3,235,083 | 2/1966 | Sontheimer et al................. | 210/83 |
| 3,425,556 | 2/1969 | Volker.............................. | 210/115 X |
| 3,565,254 | 2/1971 | Latimer............................. | 210/242 |
| 3,578,171 | 5/1971 | Usher................................ | 210/DIG. 21 |
| 3,630,363 | 12/1971 | Nash.................................. | 210/169 |

FOREIGN PATENTS OR APPLICATIONS
96,580   1/1961   Netherlands...................... 210/115

*Primary Examiner*—Theodore A. Granger
*Attorney, Agent, or Firm*—Young & Thompson

[57] ABSTRACT

A barge for separating oil-water mixtures comprises a sealed tank into which the mixture is pumped for gravity separation. Pumping is effected by withdrawing the separated water from the bottom of the tank by means of a pump that produces a negative pressure in the tank, and this negative pressure sucks up the oil-water mixture from the surface of the water, without subjecting the mixture to mechanical pumping. An intake pipe for the mixture has a cylindrical basket at its intake end surrounded by a cylindrical casing open at its top and closed at its bottom. The intake pipe opens upwardly into the tank, and water is withdrawn from the lower end of the downwardly converging walls of the tank.

1 Claim, 6 Drawing Figures

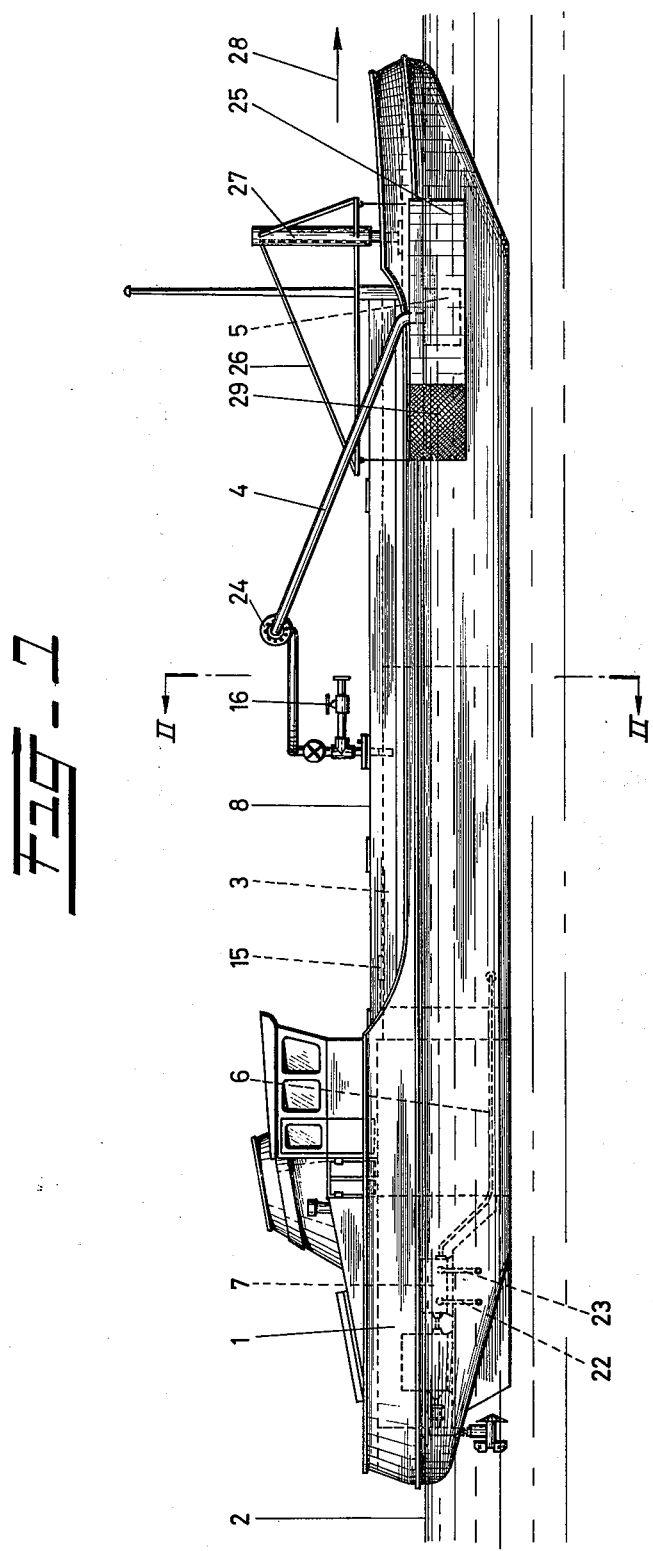

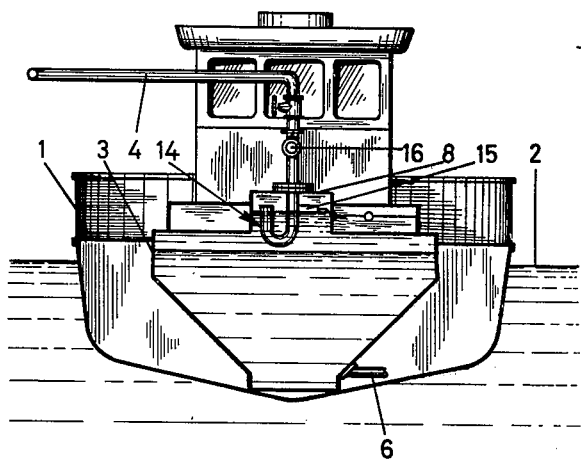
Fig_2a
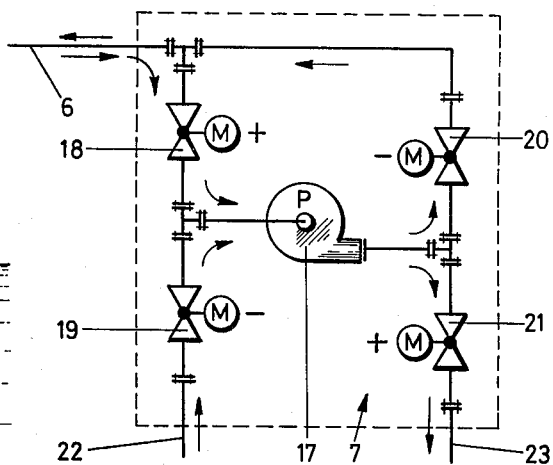
Fig_2b
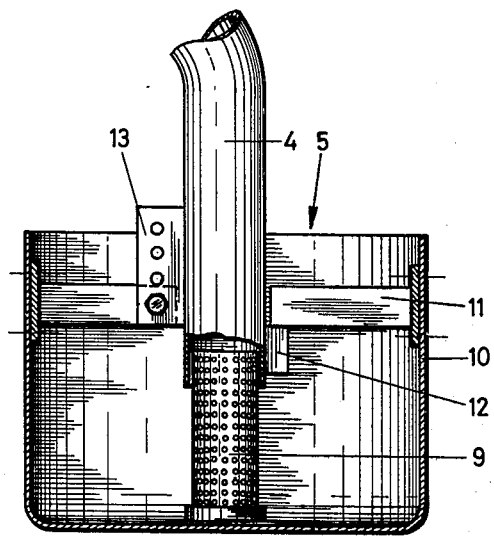
Fig_3a
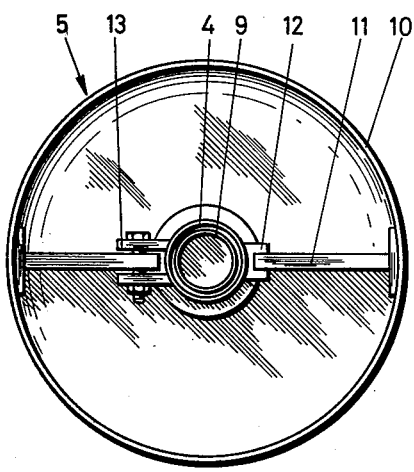
Fig_3b

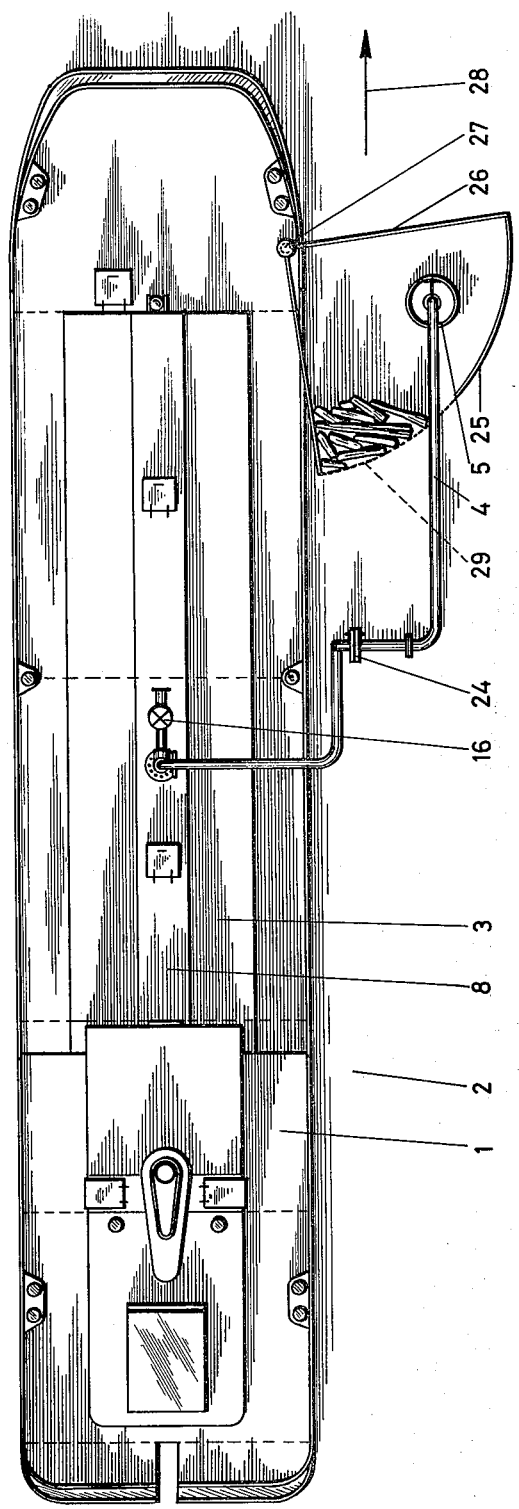

METHOD AND APPARATUS FOR SEPARATING LIQUIDS OF DIFFERENT SPECIFIC GRAVITIES FROM A MIXTURE OF THE SAME

The present invention relates to a method for separating two liquids of different specific gravities from a mixture of said liquids. In such a method the separation has to be accomplished when the mixture is in the quietest state, that is to say where said mixture is subjected to the smallest influences and forces causing disturbances so that the influence of the difference in specific gravities by which separation is achieved can have its greatest effect. On the other hand during the separation the separated liquids have to be withdrawn from the separating space and in order to continue the process mixture has to be supplied to said space. Said liquid withdrawal as well as said mixture supply cause disturbances, currents, whirls and the like in the separating space which impair a fast and accurate separation of said liquids.

In practice, when the present invention is used for separating oil and water from an oil-water mixture in rivers, canals or the open sea, for instance in the vicinity of beaches, the mixture to be treated will have a plurality of floating solid impurities of substantial size, such as pieces of wood and the like, which hamper the supply of said mixture to the separating space and even the withdrawal of the separated liquids, so that the process has to be interrupted in order to remove objects that clog the mixture supply pipe and liquid discharge pipe.

It is the object of this invention to provide a method of the above type, in which said disadvantages have been overcome.

In accordance with the principles of the present invention the above object is obtained by a method for separating two liquids, of different specific gravities from a mixture of said liquids, comprising the step in which the mixture is sucked up to a separating tank through a mixture supply pipe the nozzle of which is provided with guard means for stripping the mixture of large solid impurities such as pieces of wood and the like, in which said sucking up is accomplished by generating an underpressure in said separating tank by the liquid of higher specific gravity separated in the separating tank being sucked out of said tank by means of a suction system having periods of suction that alternate with periods of positive pressure so that the flow through said mixture supply pipe reverses.

In using the method of this invention, the process can proceed continuously. The accumulation of large solid impurities at the location where the mixture is sucked up to the separation tank is avoided by reversing the pressure from negative to positive for a period much shorter than the suction period, and this also prevents the formation of whirlpools in the tank.

When withdrawing the liquid of heavier weight from the tank it cannot be avoided that particles of the liquid of lighter weight having unsufficient rising capacity are carried along by the liquid of heavier weight, but the above-mentioned reversal returns these rapidly to the separation area.

The arrangement for carrying out the above-mentioned method comprises a separating tank having near its bottom a discharge pipe for discharging the liquid of higher specific gravity, a mixture supply pipe connected to said tank, the free end of the discharge pipe having a guard means, and a suction system connected to said separating tank. Said guard means consists of a cylindrical perforated basket fixed to the nozzle of the mixture supply pipe, said basket being surrounded by a cylindrical casing open at its top. The other end of said mixture supply pipe empties into the upper part of the hermetically closed separating tank. The suction system includes switch means or reversing means for generating selectively positive and negative pressures.

The guard means according to the invention has the effect that the sucked up mixture flows into the box in a rapid stream. In such a case it is very difficult for large foreign objects to enter the annular space between the basket and the casing and in entering the space between the basket and casing they assume an upright position so that the contact surface between the piece of wood and the basket is very small. Consequently said contact surface does not contribute much to blocking the basket perforations.

By the use of a hermetically closed separating tank in which negative pressure is generated, the mixture entering the tank will be less agitated than if the mixture were pumped into the tank through a pump in the mixture supply pipe. By means of the suction system including switch means or reversing means for generating selectively positive and negative pressure in the tank, it is possible to backwash the filter comprised by the guard means.

Further, the separating tank cross section increases upwardly. In generating negative pressure by withdrawing the water from the tank through the suction system it cannot be avoided that the water will entrain particles having insufficient rising capacity, and carry these particles toward the connection of the suction system to the tank. This disadvantage is avoided as much as possible by connecting the suction system to the tank at a location as far as possible from the separation zone of the two liquids, consequently as near as possible to the tank bottom. The tank cross sectional shape has the advantage that a predetermined amount of water or other liquid of heavier weight in the tank occupies a greater height than in case the tank cross section were cylindrical or rectangular.

Preferably the separation tank has a float coupled to a control system in order to reverse the operation of the suction system depending on the position of the float in the tank. The suction system is thus automatically reversed to positive pressure if the supply of mixture is reduced by blocking of the mixture supply pipe inlet and/or if air enters the tank causing a drop in the liquid level in the tank.

In a specific embodiment of the separator according to the invention the suction system includes a valve in front of and behind the pump respectively, the pipe portion between this front valve and the pump having a tap including a valve whereas the pipe portion between the pump and the following valve communicates through a connecting pipe including a valve with the discharge pipe between the tank and the front valve.

In this embodiment, the control system is connected to the float and closes the valves in front of the pump and behind the pump in dependence on the position of the float while opening the remaining two valves in the suction system.

In order to avoid a carry-over of too many particles of liquid of lighter weight when discharging liquid of heavier weight, a detector for observing the presence of liquid of lighter weight is positioned near the connection of the liquid of heavier weight discharge pipe to the tank.

Another object of the invention is to provide a barge in which the separator is mounted. By mounting the separator in a barge, the method according to the invention leads to a barge having an almost constant draft. As a matter of fact, at the onset of operation, the separation tank is filled with water, and after termination of the operation the tank is substantially filled with oil.

Preferably the mixture supply pipe consists of two pipe sections of solid non-flexible material hinged to each other. Thus it is possible to give the mixture supply pipe a predetermined position during barge movement, in which the guard means of the pipe is in a predetermined position with respect to the barge's hull.

In operation, the guard means is subjected to an upward force by the suction in the guard means. In order to maintain the guard means at the required distance beneath the surface of the oil-water mixture, the hinged connection between the pipe sections of solid non-flexible material of the mixture supply pipe can be secured in a selected setting or can be controlled positively. Thus the mixture supply pipe comprises a rigid unit and the barge has almost constant draft in operation.

In order to concentrate in the guard means the greatest amount of mixture to be separated during movement of the barge with a speed of, say, about three miles per hour, the barge is provided with a projecting catching screen which is positioned behind the guard means of the mixture supply pipe near the hull of the barge, which catching screen extends almost perpendicular to the longitudinal axis of the barge. Preferably the catching screen is a long plate subtending an arc of a circle of about 90° and a part of which is perforated.

Further characteristics of the invention will become apparent from the following description of an embodiment thereof, taken in conjunction with the drawings, in which:

FIG. 1 is a schematic view illustrating a barge in which apparatus embodying the present invention has been positioned;

FIG. 2a is a section taken on the line II—II of FIG. 1 and showing the tank of the apparatus according to the present invention;

FIG. 2b is a fluid circuit diagram of the suction system;

FIGS. 3a and 3b are side cross sectional and plan views, respectively, showing details of the guard means; and FIG. 4 is a top plan view of the barge showing the position of the catching screen during operation.

The apparatus of the invention can be stationary but it is also possible to mount it on a movable support for moving along e.g. the towing path of a channel. Most often the apparatus will be mounted in a barge or other vessel for operation on a river or at sea.

Referring now to FIG. 1, a schematic view of a barge including a device embodying the present invention is shown. FIG. 1 shows diagrammatically a barge 1 floating on the water 2. Barge 1 comprises a separating tank 3 having a mixture supply pipe 4 connected at one end to said tank. The other end of the mixture supply pipe is submerged in the oily water mixture and has a guard means 5. A discharge pipe 6 for water is connected to tank 3 near its bottom. The other end of discharge pipe 6 is connected to suction system 7 (FIG. 2b). Said tank 3 is a hermetically closed reservoir extending throughout the greatest part of the length of the barge.

Before operation tank 3 is completely filled or filled to just below its top wall 8 with water. The suction system 7 is started and the suction generated in tank 3 sucks up oily water mixture to tank 3 through guard means 5 and mixture supply pipe 4. Water is discharged outboard through pipe 6. It will be evident that in operation, the water oil separation is accomplished in the tank 3 near the surface; that is, an oil layer collects on top of the liquid in tank 3. During operation the thickness of said layer increases continuously until said tank is filled with oil to an extent which prevents a further suitable separation after which the operation is stopped and the barge is moved to a place for draining away the oil by any conventional means.

By sucking the oily water mixture into tank 3, the mixture entering the tank is less agitated than by pumping up said oily water mixture to tank 3. Reduced agitation promotes the desired separation.

It will, of course, be apparent to those skilled in the art that when discharging water through pipe 6 smaller particles of oil having insufficient rising capacity are carried along by the water in the direction to the discharge pipe connection to tank 3. In order to reduce as much as possible the amount of oil particles thus entrained, the distance between the oil layer in the tank and the connection of discharge pipe 6 to tank 3 should be as great as possible. For this purpose tank 3 has a cross section which increases upwardly (see FIG. 2a).

During operation the suction inlet of the mixture supply pipe 4 should not be allowed to become obstructed by solid objects such as pieces of wood or the like which are usually present in the oily water area. This is prevented by guard means 5 which (see FIG. 3a) consists of a cylindrical sieve 9 fixed to the end of the mixture supply pipe 4, sieve 9 being surrounded by a cylindrical casing 10 with a bottom wall. Casing 10 is connected to the suction pipe by means of a spider 11 (see FIG. 3b) in such a manner that casing 10 can be tilted with respect to said suction pipe. Further said suction pipe is provided with a fixed stop 12 at the one side and an adjustable stop 13 at the other side in order to fix casing 10 in a predetermined tilted position.

The mixture supply pipe inlet end defines with the surrounding casing 10 an annular passage. It is very difficult for objects of substantial size, for instance pieces of wood, to enter this annular passage. If they do, they have an almost vertical position so that the contact surface between the piece of wood and sieve 9 is small. Consequently the contribution of such objects to blocking the inlet is as small as possible. It will be evident that the apparatus according to the invention then can operate during a substantially longer period than without guard means 5.

The sucked up mixture is emptied into the tank 3 through an upwardly bent outlet 14 the end of which lies a short distance above the liquid level. In this way the incoming mixture falls gently on the liquid. This is done in order to reduce agitation of the liquid in the tank and to augment the separation.

However, if an accumulation of foreign objects in the casing 10 causes a decrease of the oily water supply during operation the suction function of suction system 7 can be reversed to a backwashing function causing the pressure in the tank to change from negative to positive for cleaning the guard means. The shape and positioning of the outlet 14 of the mixture supply pipe cause the flow through pipe 4 to be substantially air when cleaning the guard means. As was pointed out above, this cleaning serves also to repel the smaller oil particles.

Reduction of the oil-water mixture supply causes a fall in the normally substantially constant liquid level in the tank, which is observed by a float 15 in the tank coupled to a control system for reversing the operation of the suction system 7 dependent on the position of float 15 in the tank.

Oil-water mixture supply pipe 4 has a branch 16 controlled by a valve. In decreasing the oil-water mixture supply it is possible to introduce air or another suitable medium through said branch.

Switching the suction of the suction system to a positive pressure is also possible in case the amount of oil particles entrained by the water is too great. Thus the invention relates to a separator of oil and water from a oily water mixture at sea or in a river, and this separation does not need a high degree of accuracy.

In the illustrated embodiment, the suction system consists of a pump 17 in a network of pipes (FIG. 2b). This network of pipes is connected on the one side to discharge pipe 6 for heavier liquid whereas both of the connections 22 and 23 communicate with outboard water. A valve 18 is disposed in the pipe section between tank 3 and the intake of pump 17, and a valve 19 is in the pipe section between pump 17 and connection 22. A valve 21 is in the pipe section between pump 17 and connection 23 and a valve 20 is in the pipe section between the outlet of pump 17 and tank 3. During normal operation valves 18 and 21 are open and valves 19 and 20 are closed. Water discharges from tank 3 through discharge pipe 6, valve 18, pump 17, valve 21 and connection 23. In case the negative pressure in the tank has to be reversed to positive pressure, valves 18 and 21 are closed and valves 19 and 20 opened. Then outboard water is supplied to the tank through connection 22, valve 19, pump 17, valve 20 and discharge pipe 6. Opening and closing the valves in this manner is controlled by float 15 through an operating system between float 15 and suction system 17 which can have any suitable form or be manually controlled.

Preferably mixture supply pipe 4 consists of a plurality of pipe sections pivotally connected to each other (see FIG. 1). In this way the guard means can be positioned at a desired location in the area to be treated. When mounting the apparatus according to the invention in a barge, these pipe sections are preferably of a non-flexible material. Further the hinge joint to which the pipe section having said guard means has been connected (FIG. 1 hinge joint 24) can be secured in a selected position. Sucking up the oil-water mixture will cause a rapid flow along the upper edge of the guard means casing 10 (FIG. 3a) imposing an upward force on the guard means which is increased by the relatively low level of the liquid within said cylindrical casing with respect to the water level outside said box. In using pipe sections of solid non-flexible material and a hinge joint 24 which can be secured in a selected position in spite of said upward force, it is possible to keep guard means 5 at a predetermined depth beneath water level. In practice it has been found desirable to tilt casing 10 with respect to the suction pipe nozzle, the tilting angle being determined by the viscosity of the oil in the oil-water mixture area. To this end, casing 10 is fixed to the supply pipe nozzle by means of a ring clip 11. Stops 12 and 13 are present for maintaining the tilted position of the casing.

It will be evident that keeping the barge draft substantially constant and keeping the guard means at a predetermined distance beneath the surface of the water are beneficial to the stability of the barge. Accordingly both measures are beneficial to a quiescent liquid condition in the tank which is necessary for a suitable separation of the two liquids of the mixture. If waves or swell are present the guard means 5 can be kept at a predetermined submersion by controlling positively the guard means 5.

FIG. 4 shows a catching screen 25, in the form of a long plate extending over a circular arc of about 90°. Said screen is movably suspended by means of a leg 26 of a stanchion 27 on the barge. In a preferred embodiment said stanchion 27 consists of two tubes one of which is mounted on the barge whereas the other one supporting said leg 26 is slidable and rotatable with respect to the first-mentioned tube. In operation said catching screen is lowered outboard the barge (see FIG. 4) so that guard means 5 is present in the space bounded by the barge hull and catching screen 25. When the barge moves in the direction of the arrow 28 in FIG. 4, for example with a speed of three miles per hour, the effect is obtained that a greater part of the oil-water mixture of the area is concentrated near guard means 5. In this connection it is pointed out that the dotted line portion 29 of catching screen 25 is perforated. In operation, large solid objects such as pieces of wood and the like which pass guard means 5 or are freed when cleaning said guard means, will collect in said perforated catching screen portion.

Although the present invention has been described and illustrated in connection with a preferred embodiment, it is to be understood that modifications and variations may be resorted to without departing from the spirit of the invention, as those skilled in the art will readily understand. Such modifications and variations are considered to be within the purview and scope of the present invention as defined by the appended claims.

Having described my invention, I claim:

1. In a barge-mounted vacuum system for removing oil from the surface of a body of water: apparatus comprising a barge supporting a sealed separating tank with a bottom, sidewalls diverging upwardly and outwardly, and a closed top, conduit means for introducing liquid into said tank with a first open end of said conduit located within casing means with a closed bottom and open top; said casing being supported so that the open end of said conduit is sealingly maintained in communication with liquid collected by said casing means from said body of water, said conduit near a second open end thereof comprising a portion extending downwardly through the closed top of said sealed tank with said portion further comprising a U-shaped bend extending upwardly locating the second open end of the conduit within the tank near the top portion thereof, reversible pump means for filling or emptying said tank with water, said pump means being in fluid communication by conduit means near the bottom of said tank whereby said reversible pump means may be utilized to discharge the liquid contents of said tank and to fill said tank with water from said body of water, float control means in said tank constructed and arranged to cause said pump maans to introduce liquid into said tank responsive to a low liquid level therein and to discharge liquid from said tank with a high liquid level therein whereby in operation of said apparatus water introduced into said tank and thereafter discharged therefrom causes a negative pressure within said tank so that liquid within said casing means is caused to flow into the upper portion of said tank and the filling and emptying of said tank is repeated so that the contents of said tank substantially comprises oil which may be discharged from said tank by said pump means.

* * * * *